(12) United States Patent
Smith

(10) Patent No.: US 8,388,009 B1
(45) Date of Patent: Mar. 5, 2013

(54) SUPPORT STAND FOR A TWO-WHEELED PEDAL VEHICLE

(76) Inventor: Lane A. Smith, Fort Worth, TX (US)

( * ) Notice: Subject to any disclaimer, the term of this patent is extended or adjusted under 35 U.S.C. 154(b) by 16 days.

(21) Appl. No.: 13/114,494

(22) Filed: May 24, 2011

Related U.S. Application Data

(60) Provisional application No. 61/347,642, filed on May 24, 2010.

(51) Int. Cl.
*B62H 1/08* (2006.01)
(52) U.S. Cl. ........................................................ 280/294
(58) Field of Classification Search .................. 280/293, 280/294, 295, 297, 298, 304
See application file for complete search history.

(56) References Cited

U.S. PATENT DOCUMENTS

| | | | | |
|---|---|---|---|---|
| 702,862 A | * | 6/1902 | Moss | 280/304 |
| 1,364,407 A | * | 1/1921 | Palmer et al. | 280/294 |
| 3,877,726 A | * | 4/1975 | Foster | 280/294 |
| 4,030,774 A | * | 6/1977 | Foster | 280/261 |
| 4,171,824 A | * | 10/1979 | Foster | 280/294 |
| 4,563,017 A | * | 1/1986 | Kimball | 280/294 |
| 4,605,242 A | * | 8/1986 | Kimball | 280/294 |
| 6,237,929 B1 | * | 5/2001 | Kielland | 280/294 |

* cited by examiner

*Primary Examiner* — Tony Winner
(74) *Attorney, Agent, or Firm* — Jackson Walker, LLP

(57) ABSTRACT

A two-wheeled vehicle comprising a frame, a pair of wheels, and a pedal assembly. The pedal assembly has a sprocket, right crank arm assembly and a left crank arm assembly (the crank arm assemblies include pedals), wherein at least one of the two crank arm assemblies comprises an outer member and an inner member, typically, the inner member being cylindrical at least partially telescopically received in the outer member. Typically one of the inner or outer member is moveable, telescopically between a retracted locked, fixed position and an extended locked, fixed position. In the extended position, the two members lock with respect to each other and allow the bicycle or other two-wheeled vehicle to lay adjacent the support surface on the removed end of the extended member, which extended member typically contains the pedal portion of the pedal assembly.

9 Claims, 7 Drawing Sheets

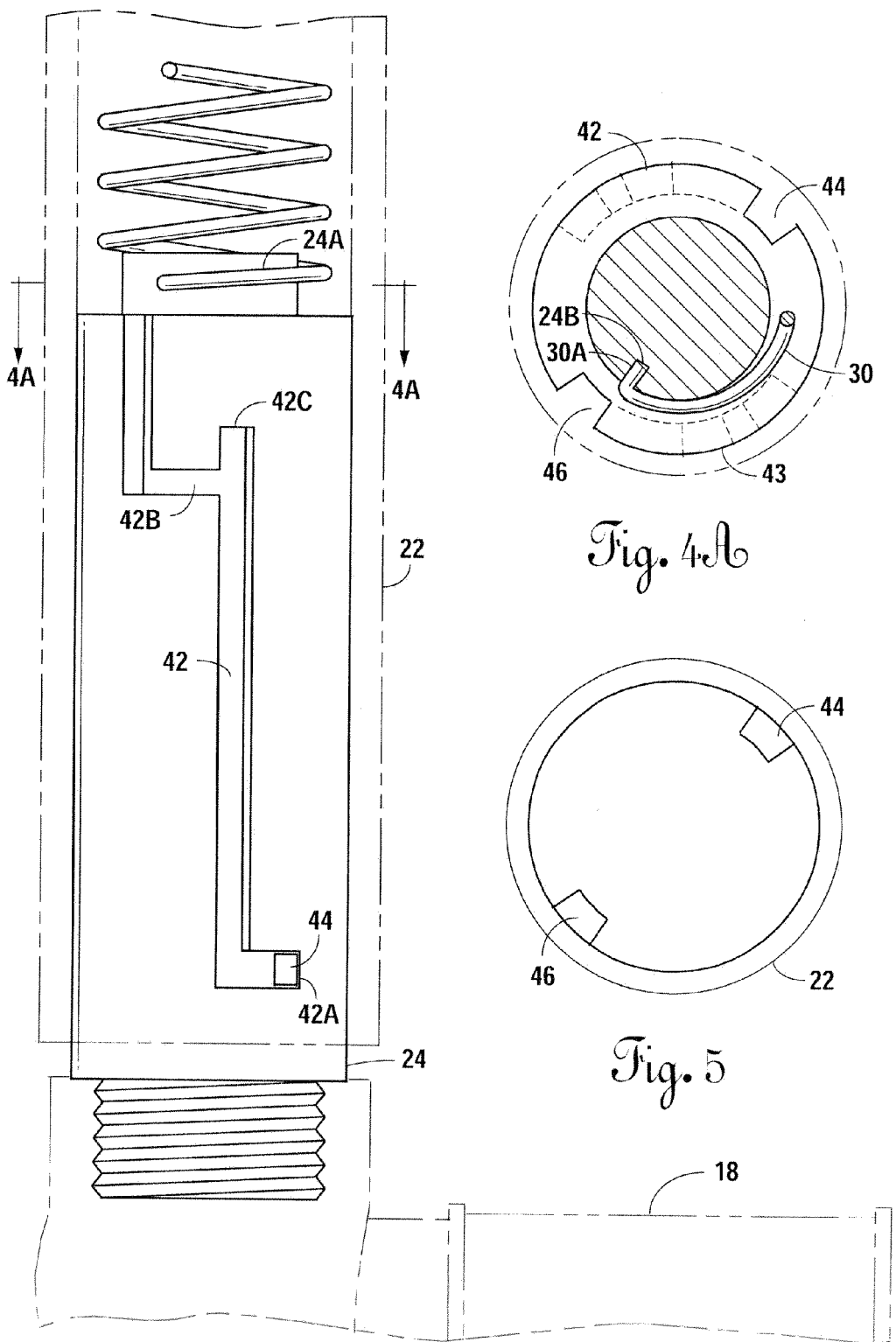

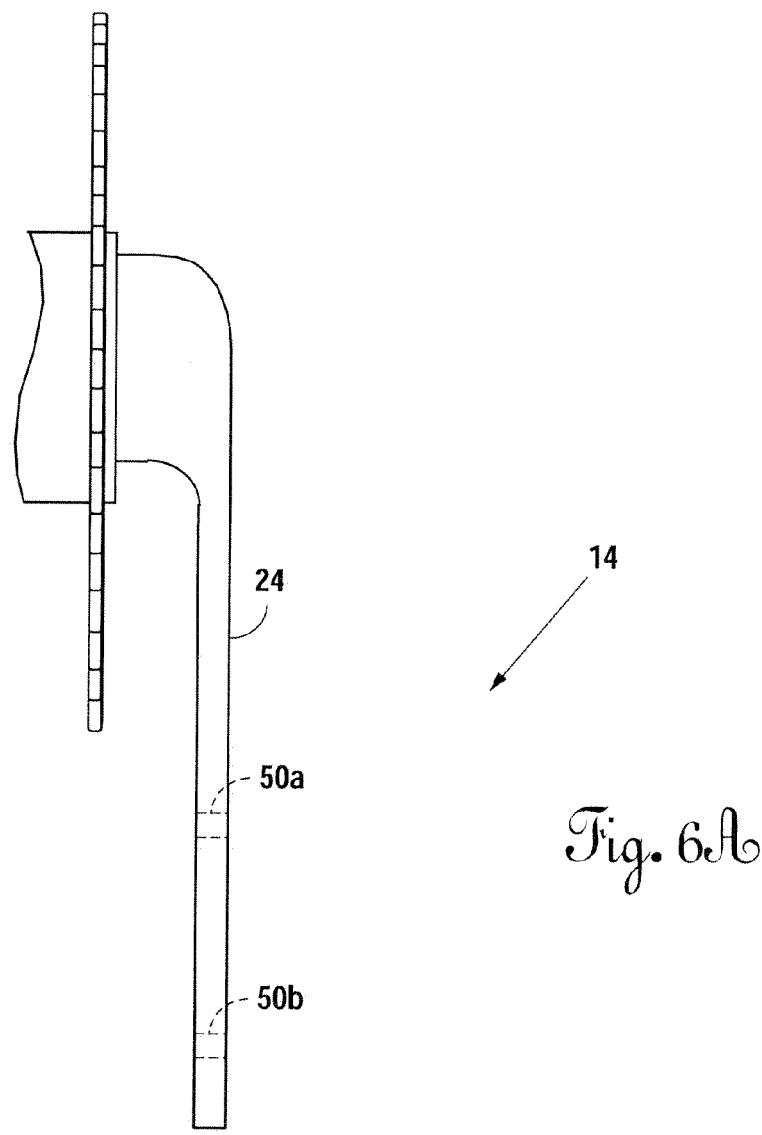
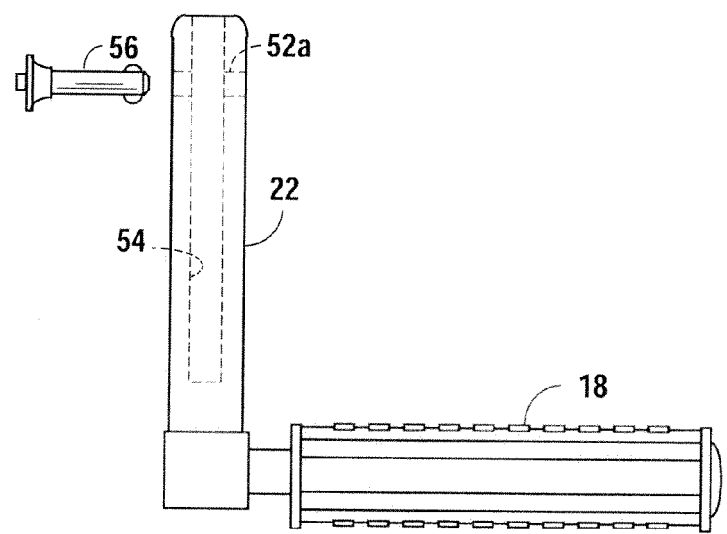
Fig. 6A

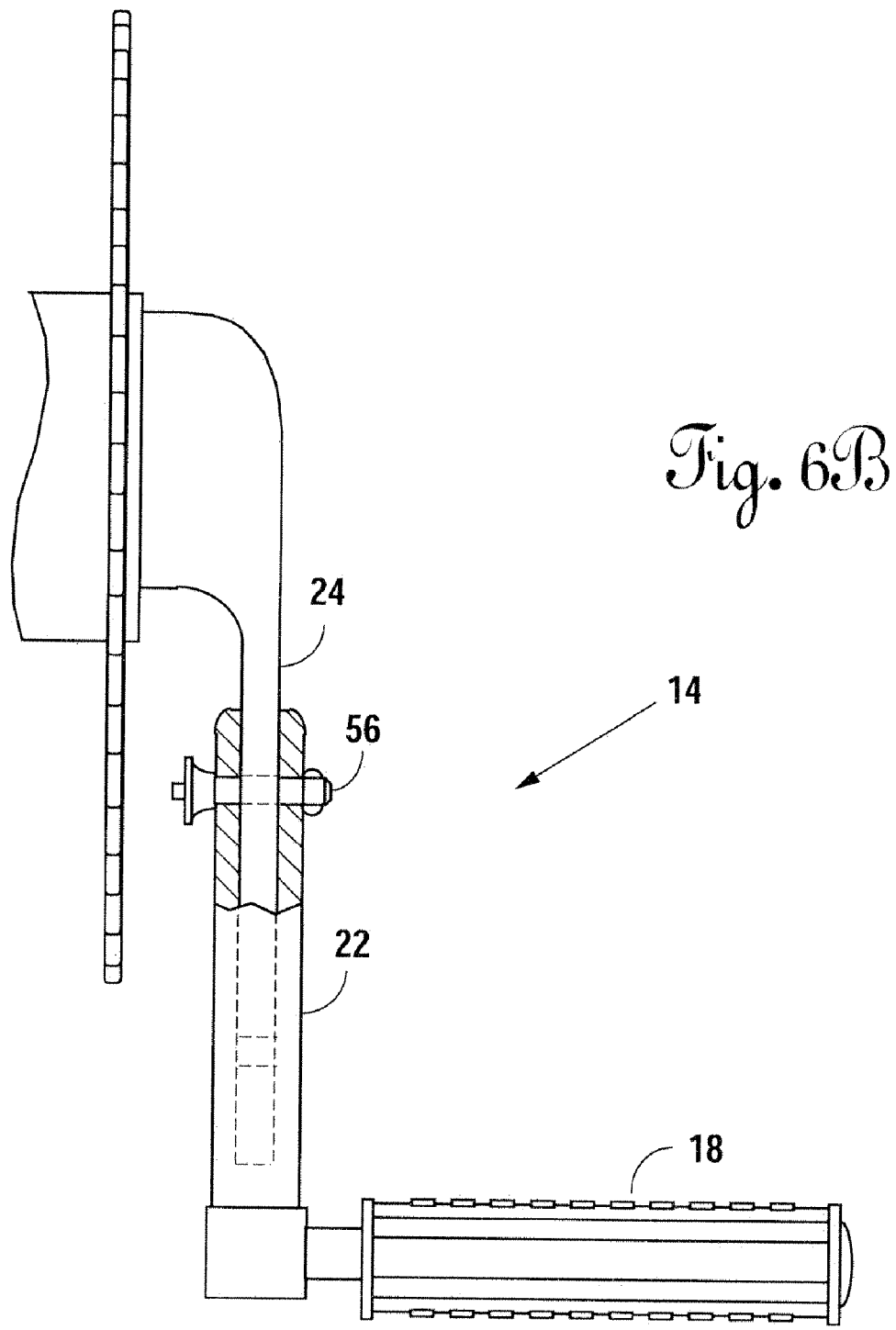

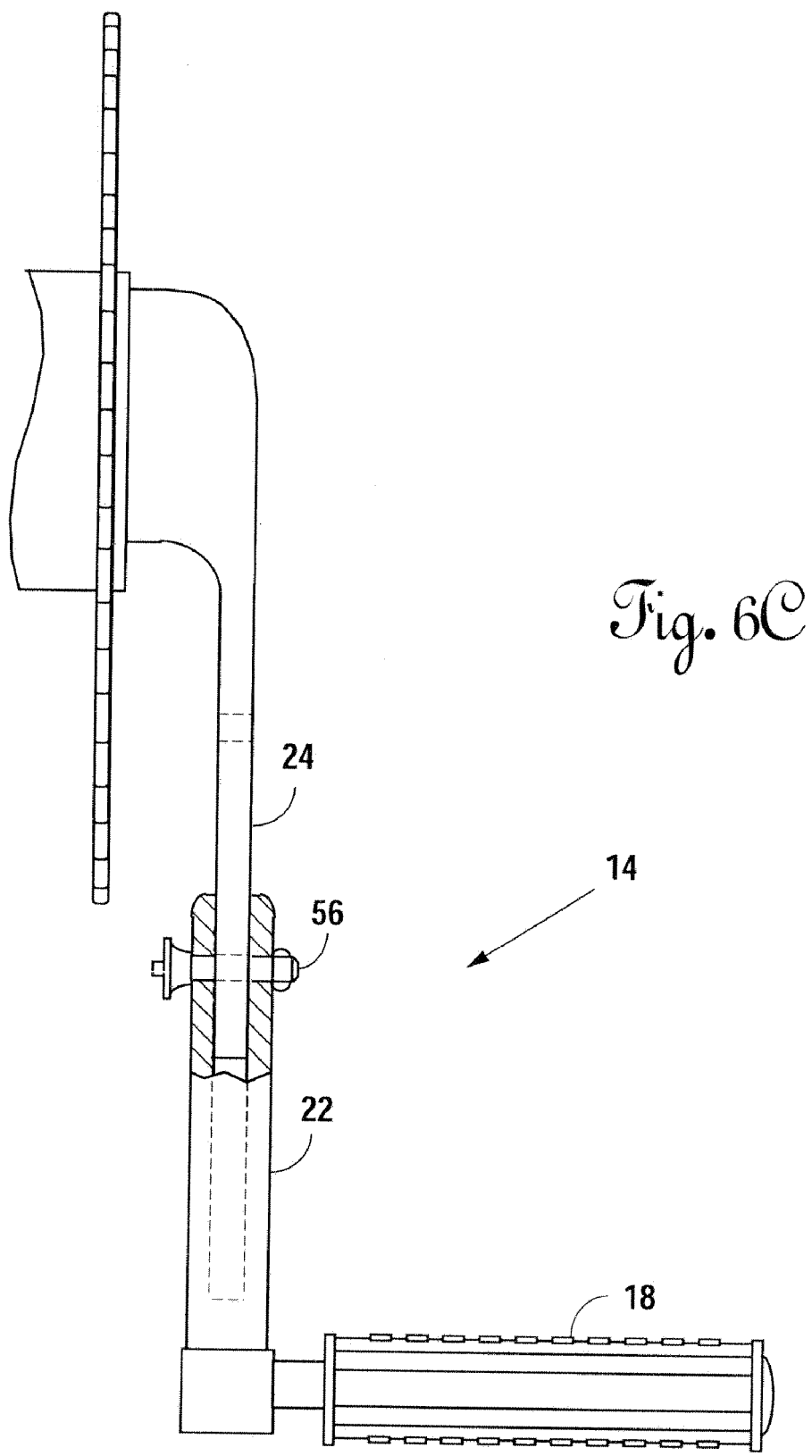

SUPPORT STAND FOR A TWO-WHEELED PEDAL VEHICLE

This utility patent application claims benefit of and incorporates herein by reference U.S. Provisional Patent Application Ser. No. 61/347,642, filed May 24, 2010.

FIELD OF THE INVENTION

Support stands for pedaled vehicles; namely, a support stand for a two-wheeled pedal vehicle.

BACKGROUND OF THE INVENTION

Two-wheeled pedal vehicles, such as bicycles and mopeds, typically require some support mechanism to support the vehicle on a support surface when it is not being pedaled or when it is not in motion.

Most support stands, sometimes called "kickstands," are not incorporated into the bicycle, per se, but are added on features. Sometimes, for example, they are bolted to the frame.

SUMMARY OF THE INVENTION

Applicant provides a two-wheeled vehicle comprising a frame, a pair of wheels, and a pedal assembly. The pedal assembly has a sprocket, right crank arm assembly and a left crank arm assembly (the crank arm assemblies include pedals), wherein at least one of the two crank arm assemblies comprises an outer member and an inner member, typically, the inner member visually being generally cylindrical, oval or other suitable shape at least partially telescopically received in the outer member.

Typically one of the inner or outer member is moveable, telescopically between a retracted locked, fixed position and an extended locked, fixed position. In the extended position, the two members lock with respect to each other and allow the bicycle or other two-wheeled vehicle to lay adjacent the support surface on the removed and of the extended member, which extended member typically contains the pedal portion of the pedal assembly.

One or both of the left and right crank arm assemblies may have these telescoping members and further the telescoping members may include either a boss and track assembly or similar structure and/or a detent assembly or similar structure whose function is to lock the two members in a retracted position (the normal position for pedaling the bicycle) and an extended position (where the extended member will rest the bicycle against the support surface).

BRIEF DESCRIPTION OF THE DRAWINGS

FIGS. 4, 4A, and 5 illustrate a second embodiment of Applicant's invention in front elevational (FIG. 4) and cutaway through Section 4A in FIG. 4A. FIG. 5 illustrates the outer member having inward directed bosses on the inner surface thereof to engage the track as seen in FIGS. 4 and 4A.

FIG. 6A-6C illustrate a third embodiment of Applicant's invention.

DETAILED DESCRIPTION OF THE PREFERRED EMBODIMENTS

Figure 1:
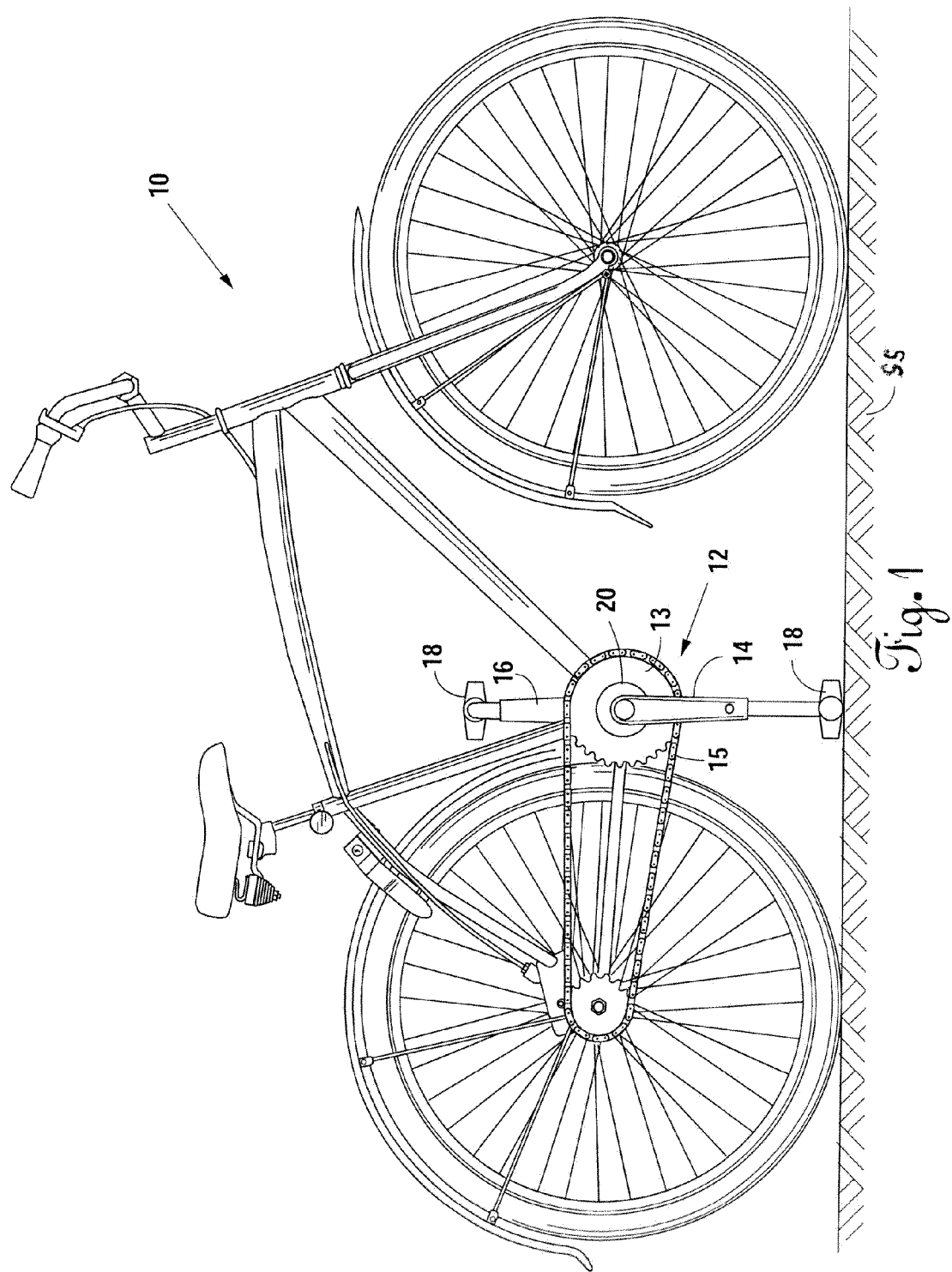
FIG. 1 is a side view of a bicycle having Applicant's novel pedal assembly engaged therewith.

FIG. 1 illustrates a two-wheeled pedal vehicle, here, a bicycle 10. As is typical, bicycle 10 includes a pedal assembly 12, including a main sprocket 13. Main sprocket 13 engages, through a chain 15, the rear wheel and rear wheel sprocket in ways known in the art.

Applicant's pedal assembly 12 includes a right crank arm assembly 14 and a left crank arm assembly 16 (left and right being designated in the frame of reference of a seated rider). Both right and left crank arm assemblies 14/16 include a pedal 18. Hub 20 engages both the left and right crank arm assemblies in ways known in the art.

However, in looking at FIG. 1, it is seen that right crank arm assembly 14 is in a position such that pedal 18 rests adjacent the ground. In other words, FIG. 1 illustrates that at least one of the crank arm assemblies is capable of extending so it may place the pedal 18 adjacent a support surface SS, such as the ground. The descriptions set forth below illustrate several different assemblies that may achieve extension of the crank arm assembly, such that a pedal 18 may rest adjacent the ground and support a slightly leaning bicycle thereby.

Turning to FIGS. 2, 2A, 3, and 3A, a crank arm assembly 14 or 16 or both is seen to have structure that comprises an outer member 22, an inner member 24, telescopically received therein. In the first embodiment set forth herein and with respect to FIGS. 2, 2A, 3, and 3A, it is seen that a track 26 and/or 27 (that is, while two tracks are illustrated, only one is required) may be provided on an inner surface of outer member 22, which track is dimensioned to receive a boss 28/29 extending outward from the outer surface of inner member 24, such that the members can assume a retracted or extended position, and wherein in both the retracted and extended positions, the members are lockingly engaged to one another, at least when there is tension (or compression) therebetween. That is, where there is force being applied on pedal 18, so as to urge the two members apart or together, the locked, retracted position prevents longitudinal movement of the inner member. Clearly, in a first or retracted position, this force must be resisted because in the normal action of pedaling, there is, especially at the bottom of the pedal stroke, often significant tension or separation force between the two members, even when the pedal is near the top of the stroke, such as just passing through the top of the stroke, a rider standing on the pedal may assert compression and therefore the structure that maintains the inner and outer members in a retracted position should be locking the two members with respect to any axial movement therebetween, that is movement on the longitudinal plane of the crank arm assembly.

Such a structure is illustrated in FIGS. 2, 2A, 3, and 3A, in which a boss and track assembly having at least one boss and track combination is utilized, often in conjunction with a spring 30 for urging the two members apart (that is, a spring under compression. Also a detent mechanism 32 may be used to help prevent rotation of the inner member 24 with respect to outer member 22 and assist the boss and track combination in resisting axial movement.

Figures 2, 2A:
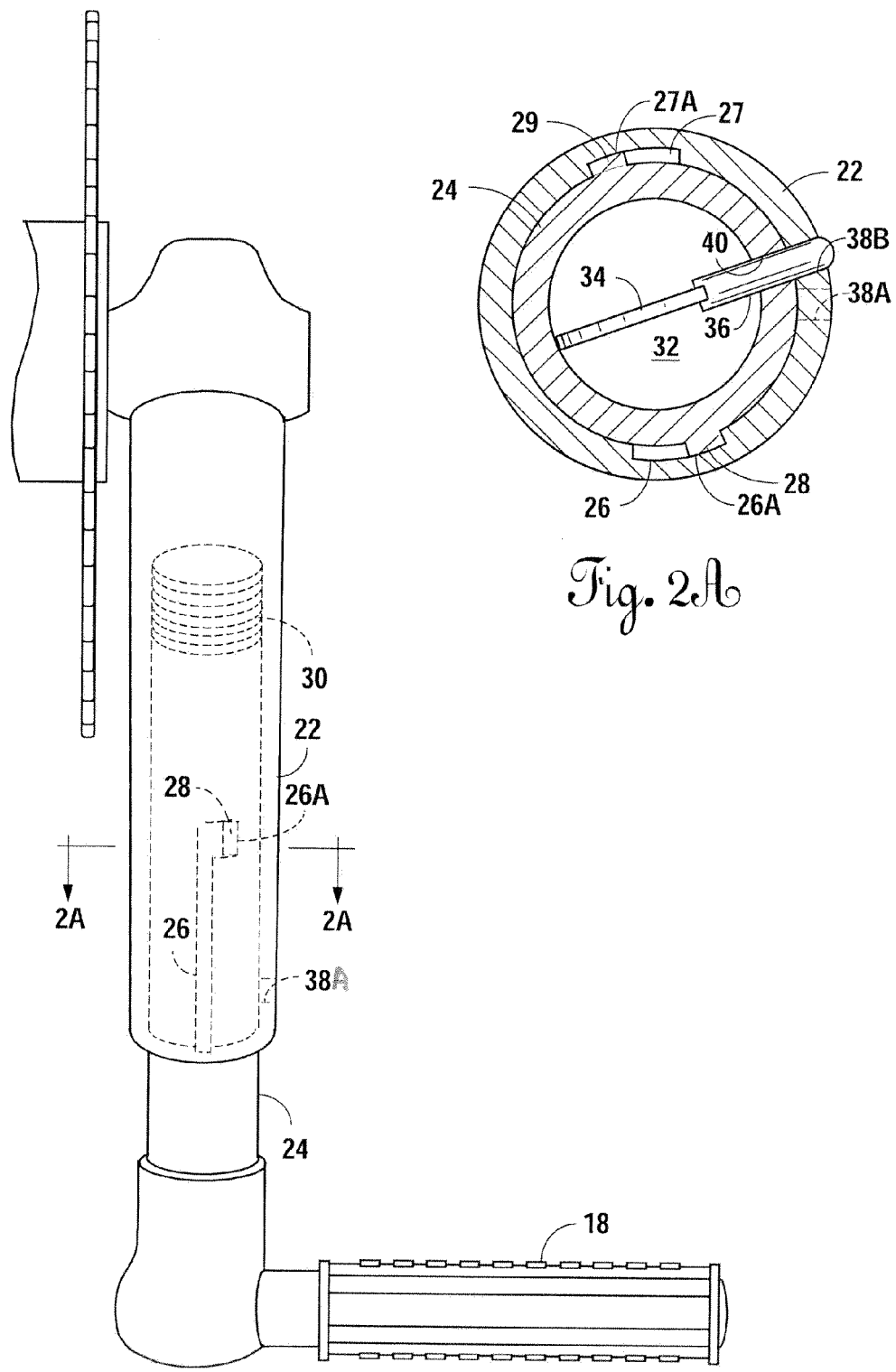
FIGS. 2 and 2A illustrate a front elevational view and a top plan view cutaway through Section 2A of a first embodiment of Applicant's pedal assembly in the retracted position.

In FIGS. 2 and 2A, a retracted position is illustrated wherein boss 28 and/or boss 29 are seen to be in a radial track extension 26a/27a off of vertically trending tracks 26/27. That is to say, illustrated in FIGS. 2 and 2A, the two bosses 28 and 29 are locked longitudinally in radial track extensions 26a/27a. Snug receipt of the boss into the channel extensions prevents tension or compression from separating the two members.

Figures 3, 3A:
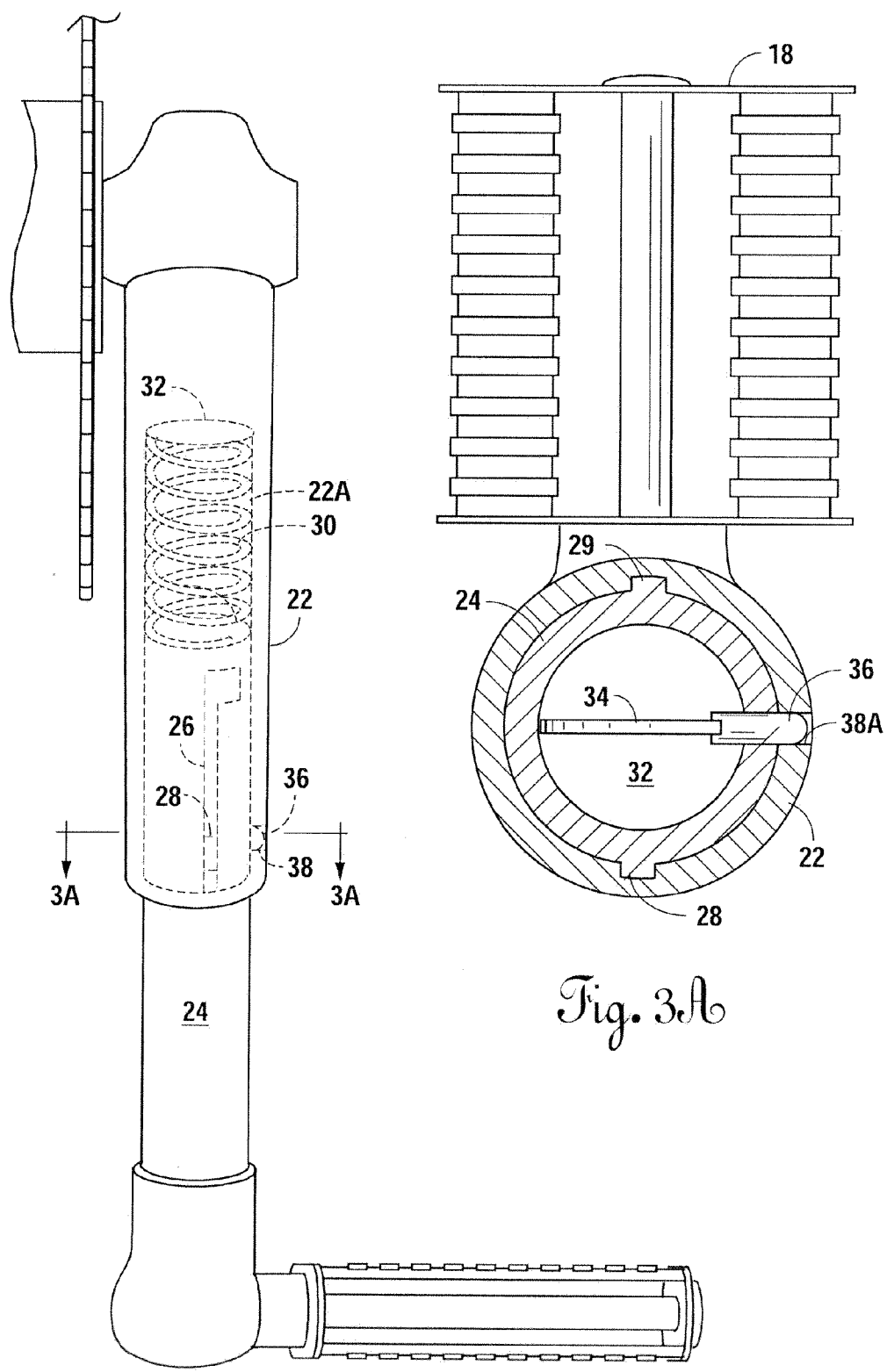
FIGS. 3 and 3A illustrate a front elevational view and a top plan view cutaway through Section 3A of a first embodiment of Applicant's pedal assembly in the extended position.

In the retracted position, the pedal is perpendicular to the plane of sprocket 20 (normal pedaling position). It may be seen, however, that rotation of the pedal and the inner member with which it is attached will move bosses 28 and 29, so that the position is in tracks 26/27. In such a position, the inner member 24 may move longitudinally away from outer member 22 and to the extended position as seen in FIGS. 3 and 3A. A spring 30 may assist in the movement from a retracted to an extended or use position as seen in FIGS. 3 and 3A, which spring will be located in the near end of cavity 22a (typically cylindrical) of the outer member, which cavity is also designed for snug telescopic receipt of inner member 24 thereinto. Moreover, tracks 26/27 will typically open to the end of the outer members for ease of assembly.

A detent mechanism 32, typically including a detent spring 34 and detent button 36 engaging one or more detent outer member holes 38 and one or more detent inner member holes 40, may be used. For example, in FIG. 2A, detent mechanism 32 is seen to lock the bosses 28/29 into the retracted position and will prevent rotation of the inner member with respect to outer member.

As seen in FIGS. 2 and 2A, detent button 36 may extend through detent inner member hole 40 and through detent outer member holes 38b to lock and prevent rotation of the inner arm when the inner arm is retracted. But when the detent button is pushed in and inner arm is rotated to channel 26 and allowed to extend, button 36 will be urged against the inner wall of outer member 22 until outer member detent button, outer member hole 38a is reached, where it will pop out to hold the outer member in an extended position, with the pedal slightly out (or up to about 90° out) of its normal riding position, perpendicular with respect to the outer member.

In FIGS. 3 and 3A, the detent mechanism, typically located engaging the inner walls of hollow inner member 24 is seen to engage hole 38a, which will longitudinally and rotatably fix inner member 24 to the extended position.

FIGS. 4, 4A, and 5 illustrate an alternate preferred embodiment of Applicant's present invention. In this embodiment, bosses (one or two) 44/46 will engage one or two tracks 42/43 in FIG. 4), which tracks 42/43 are on the outer wall of inner member 24 as seen in FIG. 5. Moreover, it is seen that a spring mounting portion 24a may extend from the typically cylindrical inner member 24 as seen in FIGS. 4 and 4A, which spring mounting portion 24a may include a spring receiving recess 24b for inserting a tail 30a of spring 30 thereinto. Anchoring spring 30 in this manner with respect to the inner member and anchoring an opposite end of spring 30 (not shown) in a similar manner or any other manner will allow spring 30 to act as a biasing member to resist twisting inner member 24 so as to seat boss 44 in radial track extension 42a as seen in FIG. 4. Spring 30 may still provide a compressive force to force inner member 24 downward when boss 44 engages channel 42. Extension 42b of channel 42 will allow the receipt of inner member 24 into outer member 22 in placing the spring under compression and bay 42c will help rotationally fix inner member 24a in an extended position.

FIGS. 6 illustrates right and/or left pedal assembly either in the retracted (normal riding) position or the extended, support stand position.

FIG. 6A illustrates, for example, right crank assembly 14 having outer member 22 and inner 24 members. Here, the members may be either telescopically received one inside the other (as illustrated) or they both may be tabular and lay one adjacent the other, so long as the holes provide locating the members with one or more pins in a retracted or extended position. In the embodiment illustrated, outer member is telescopically received into inner member. Inner member has an upper hole 50a and lower hole 50b. Outer member 22 has a cavity 54 thereinto and a hole, here a single hole 52a, therethrough. As seen in FIG. 6B, when the upper and lower members are positioned so it is a retracted or normal riding position, pin or fastener 56 may slide through holes 50a/52a, which are aligned. Removal of fastener or pin 56 and sliding outer member 22 downward until it lays adjacent with hole 50b will allow receipt of the pin therethrough and locking and locating the crank a assembly in an extended position.

While a telescopic assembly is illustrated in FIGS. 6A-6C, with the telescoping preventing pivoting when a single pin is used, pairs of fins may be used with three holes through the inner member 24 and two through the outer member, which will with use of two pins lock non-telescoping but adjacent members next to one another with a two pin combination, the middle hole always being used whether in the retracted or extended position.

The terms inner and outer member are arbitrary and they could be just as well designated first and second member.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A two-wheeled vehicle comprising:
a frame;
a pair of wheels connected to the frame to support the frame above a support surface;
a pedal assembly engaging the frame and a rear wheel of the pair of wheels, the pedal assembly having a right crank arm assembly and a left crank arm assembly wherein at least one of the crank arm assemblies comprises an outer member and an inner member, wherein one of the outer or inner members is moveable between a retracted position and an extended position, the extended position for placing the pedal of the crank arm assembly adjacent a support surface;
wherein the inner member is moveable and telescopically received at least partially inside the outer member; and
wherein the at least one crank arm assembly includes a track and boss structure for locking the two members against longitudinal movement when in the extended position.

2. The two-wheeled vehicle of claim 1, wherein the at least one crank arm assembly further includes a detent assembly to prevent rotation between the inner member and the outer member.

3. The two-wheeled vehicle of claim 1, wherein the track and boss assembly includes a boss on the outer member and a track on the inner member.

4. The two-wheeled vehicle of claim 1, wherein the track and boss assembly includes a boss on the inner member and a track on the outer member.

5. The two-wheeled vehicle of claim 4, wherein the at least one crank arm assembly further includes a spring between the inner and the outer members.

6. The two-wheeled vehicle of claim 5, wherein the at least one crank arm assembly further includes a detent assembly.

7. The two-wheeled vehicle of claim 1, wherein the at least one crank arm assembly further includes a spring under compression between the inner and the outer members.

8. The two-wheeled vehicle of claim 1, wherein the at least one crank arm assembly includes a track and boss structure for locking the crank arm assembly in the extended position; wherein the at least one crank arm assembly further includes a detent assembly; wherein the track and boss assembly includes a boss on the inner member and a track on the outer member; and wherein the at least one crank arm assembly further includes a spring between the inner and the outer members.

9. A two-wheeled vehicle comprising:
a frame;
a pair of wheels connected to the frame to support the frame above a support surface; and
a pedal assembly, the pedal assembly having a right crank arm assembly and a left crank arm assembly wherein at least one of the crank arm assemblies comprises an outer member and an inner member, wherein one of the outer or inner members is moveable between a retracted position and an extended position, the extended position for placing a pedal of the crank arm assembly adjacent a support surface;
wherein one of the inner and outer members that is moveable between a retracted position and an extended position has the pedal extending about perpendicular from a removed end thereof and the other of the outer and inner members is attached at a near end to a hub of the frame.

* * * * *